(12) United States Patent
Werth et al.

(10) Patent No.: US 10,907,994 B2
(45) Date of Patent: *Feb. 2, 2021

(54) SENSOR DEVICES, SYSTEMS AND METHODS (71) Applicant: Infineon Technologies AG, Neubiberg (DE)

(72) Inventors: Tobias Werth, Villach (AT); Dirk Hammerschmidt, Finkenstein (AT); Helmut Koeck, Villach (AT); Andrea Monterastelli, Villach (AT)

(73) Assignee: Infineon Technologies AG

( * ) Notice: Subject to any disclaimer, the term of this patent is extended or adjusted under 35 U.S.C. 154(b) by 0 days.

This patent is subject to a terminal disclaimer.

(21) Appl. No.: 16/743,364

(22) Filed: Jan. 15, 2020

(65) Prior Publication Data

US 2020/0149928 A1    May 14, 2020

Related U.S. Application Data

(63) Continuation of application No. 15/944,972, filed on Apr. 4, 2018, now Pat. No. 10,551,221.

(30) Foreign Application Priority Data

Apr. 4, 2017    (DE) .......................... 10 2017 107 228

(51) Int. Cl.
*G01D 5/243*    (2006.01)
*G01D 5/14*    (2006.01)
(Continued)

(52) U.S. Cl.
CPC ............. *G01D 5/243* (2013.01); *G01D 5/145* (2013.01); *G01D 5/244* (2013.01); *G01D 5/24404* (2013.01); *G01D 5/2451* (2013.01)

(58) Field of Classification Search
None
See application file for complete search history.

(56) References Cited

U.S. PATENT DOCUMENTS

| 3,808,560 | A | 4/1974 | Gassmann |
| 3,963,987 | A | 6/1976 | Rivere |

(Continued)

FOREIGN PATENT DOCUMENTS

| CN | 101198873 A | 6/2008 |
| CN | 101762289 A | 6/2010 |

(Continued)

OTHER PUBLICATIONS

Draxelmayr, Dieter, "A Self-Calibrating Hall Sensor IC With Direction Detection", IEEE Journal of Solid-State Circuits, vol. 38, Issue No. 7, Jul. 2003, pp. 1-6.

*Primary Examiner* — Jas A Sanghera
(74) *Attorney, Agent, or Firm* — Design IP (57) ABSTRACT

Magnetic field sensor devices, corresponding systems and corresponding methods are discussed where a plurality of magnetic field sensors senses a magnetic field. An evaluation circuit generates a first signal component associated with a periodicity of a magnetic field, and a second signal component at least for periods of the magnetic field exceeding a threshold period length, the second signal component having a resolution smaller than the first signal component.

20 Claims, 6 Drawing Sheets

(51) Int. Cl.
  *G01D 5/244*  (2006.01)
  *G01D 5/245*  (2006.01)

(56) References Cited

U.S. PATENT DOCUMENTS

| | | |
|---|---|---|
| 5,168,274 A | 12/1992 | Wakamatsu |
| 5,955,878 A | 9/1999 | Peilloud et al. |
| 7,012,420 B2 | 3/2006 | Rodi |
| 8,173,950 B2 | 5/2012 | Thor et al. |
| 8,253,413 B2 | 8/2012 | Hammerschmidt et al. |
| 8,736,258 B2 | 5/2014 | Trontelj |
| 9,234,908 B2 | 1/2016 | Shibata et al. |
| 9,240,800 B2 | 1/2016 | Hammerschmidt et al. |
| 9,389,098 B2 | 7/2016 | Hammerschmidt et al. |
| 9,524,548 B2 | 12/2016 | Kirenko et al. |
| 9,605,974 B2 | 3/2017 | Saito et al. |
| 10,551,221 B2 * | 2/2020 | Werth .................. G01D 5/243 |
| 2002/0105445 A1 | 8/2002 | Shirai et al. |
| 2004/0140793 A1 | 7/2004 | Rodi |
| 2008/0218159 A1 | 9/2008 | Hinz et al. |
| 2014/0278224 A1 | 9/2014 | Trontelj |
| 2015/0077093 A1 | 3/2015 | Saito et al. |
| 2018/0210004 A1 * | 7/2018 | Tepass .................. G01D 5/145 |

FOREIGN PATENT DOCUMENTS

| | | |
|---|---|---|
| CN | 101836085 A | 9/2010 |
| CN | 102576458 A | 7/2012 |
| CN | 102803904 A | 11/2012 |
| CN | 104457552 A | 3/2015 |
| DE | 2631017 A1 | 1/1978 |
| DE | 102013104783 A1 | 11/2013 |
| DE | 102015213572 A1 | 1/2017 |
| EP | 1437574 A | 7/2004 |
| KR | 1020100061127 A | 6/2010 |
| WO | 2010100407 A1 | 9/2010 |
| WO | 2017012744 A1 | 1/2017 |

* cited by examiner

SENSOR DEVICES, SYSTEMS AND METHODS

CROSS-REFERENCE TO RELATED APPLICATIONS

This application is a continuation of U.S. patent application Ser. No. 15/944,972 filed Apr. 4, 2018, which claims the benefit of German Patent Application No. 10 2017 107 228.4 filed Apr. 4, 2017, which are incorporated by reference as if fully set forth.

FIELD

The present disclosure relates to sensor devices, systems and methods.

BACKGROUND

Magnetic field sensors may be used for detecting and measuring a movement or position in a variety of applications. Generally, in such settings, a magnet arrangement is moveable relative to one or more magnetic field sensors. By this relative movements, the magnetic field sensors experience a varying magnetic field and thus may detect the movement.

A particular application is the measurement of rotational speeds, for example in automotive applications. In such applications, usually a pole wheel (i.e., a wheel, disc or circle where magnets are arranged with alternating poles on a circumference) or a tooth wheel (a toothed magnet) is arranged coupled to a rotational axis, such that a magnetic field sensor, which is stationary relative to this axis, experiences a varying magnetic field when the wheel rotates due to the rotation of the axis. In case of a constant rotational speed, the modulation of the magnetic field in such settings often is periodic.

Such sensors are for examples used in anti-lock braking system (ABS) sensors to measure the revolution speed of each tire of a car. In such an application, for example pole wheels having 48 pole pairs are used. Typical conventional sensors then capture the varying magnetic field caused by rotation of the pole wheel and generate a pulse for example at each zero crossing of the sensed field or a signal derived therefrom, resulting in 96 pulses per revolution of the tire in this example. For a typical tire circumference of 2 m this means a spatial resolution of 2 cm.

However, for some applications such a resolution may be insufficient. For example, for car parking systems where a car parks autonomously, the car often moves very slowly. With a resolution of 2 cm, this may cause a comparatively long time between the above mentioned pulses, such that the position of the car based on such sensors may not be updated often enough to enable precise parking. Therefore, a higher resolution of such sensors would be desirable for some application.

One straightforward way to increase the resolution would be to increase the number of pole pairs in the pole wheel (or the number of teeth in a toothed magnetic wheel). However, this increases manufacturing costs for the pole wheel or tooth wheel, in particular if for example a doubling of the resolution is needed.

SUMMARY

A sensor device as defined in claim 1 and a method as defined in claim 15 are provided. The dependent claims define further embodiments as well as a system including such a device.

According to one or more embodiments, a sensor device is provided. the sensor device includes a magnetic field sensor arrangement including a plurality of (i.e., at least two) magnetic field sensors, and an evaluation circuit coupled to the magnetic field sensor arrangement and configured to generate a first signal component associated with a periodicity of a magnetic field sensed by the magnetic field sensor arrangement (e.g., having pulses at zero crossings of the magnetic field or a signal derived therefrom) and to generate a second signal component having a resolution smaller than one half period of the magnetic field at least when a period length of the sensed magnetic field exceeds a predetermined threshold.

Furthermore, according to one or more embodiments, a system is provided that includes a magnetic field generating device generating a periodic magnetic field, and the sensor device described above, where the magnetic field generating device is movable relative to the magnetic field sensor arrangement of the sensor device.

According to another embodiment, a method is provided that includes measuring a magnetic field with a magnetic field sensor arrangement including a plurality of magnetic field sensors, generating a first signal component associated with a periodicity of the magnetic field, and generating a second signal component with a resolution smaller than one half period of the magnetic field.

The above summary is merely intended to give a brief overview over some features of some embodiments and is not to be construed as limiting in any way, as other embodiments may include different features than the ones discussed above.

DETAILED DESCRIPTION

In the following, various embodiments will be described referring to the attached drawings. It should be noted that these embodiments are given for illustrative purposes only and are not to be construed as limiting. For example, while embodiments may be described as comprising numerous features or elements, in other embodiments some of these features or elements may be omitted, and/or may be replaced by alternative features or elements. In addition, apart from the features or elements explicitly shown in the drawings or described herein, further features or elements may be provided, for example features or elements conventionally used in magnetic field sensor devices, movement sensor devices and systems and/or speed sensor devices and systems.

Features or elements from different embodiments may be combined to form further embodiments. Variations or modifications described with respect to one of the embodiments may also be applied to other embodiments unless noted otherwise.

Any electrical connections or couplings shown in the drawings or described herein may be direct electrical connections or couplings, i.e., electrical connections or coupling without intervening elements, or may be indirect connections or couplings, i.e., electrical connections or couplings with one or more additional intervening elements, as long as the general purpose of the connection or coupling, for example to transmit a certain kind of signal, to transmit a certain kind of information or to provide a certain kind of control, is essentially maintained. Furthermore, connections or couplings may be wire-based connections or wireless connections.

Figure 1:
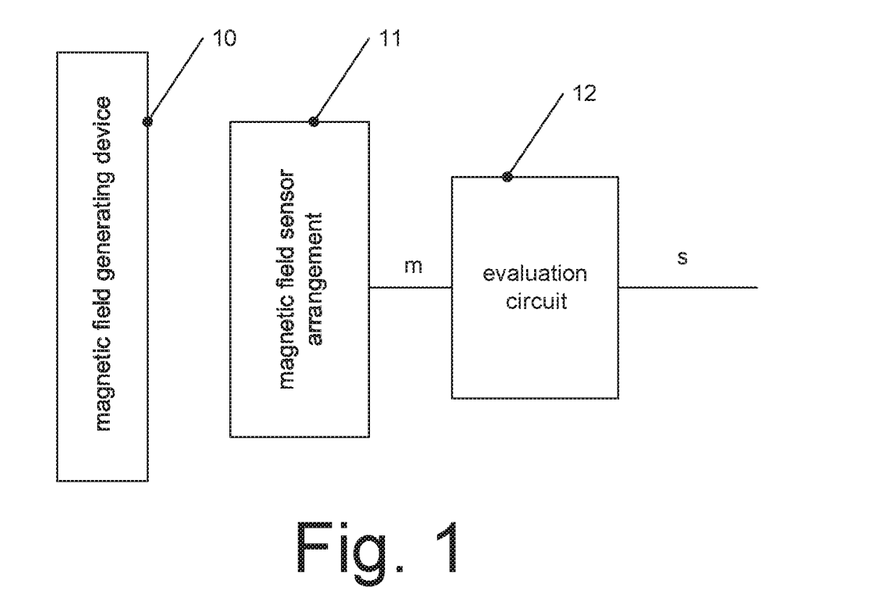
FIG. 1 is a block diagram of a system according to an embodiment.

Turning now to the Figures, FIG. 1 illustrates a system according to an embodiment. The system of FIG. 1 comprises a magnetic field generating device 10, which may comprise one or more magnets. In some implementations, magnetic field generating device 10 may comprise a pole wheel or tooth wheel attached to a rotating element like an axis of a car, a tire of a car or a shaft or other rotating element in a transmission chain of a car, but is not limited to these rotating elements. In other implementations, magnetic field generating device 10 may comprise a magnet arrangement, for example comprising a plurality of magnets forming pole pairs, coupled to a linearly moving element. In some implementations, when the rotating element or linearly moving element moves with a constant speed, magnetic field generating device 10 generates a periodically modulated magnetic field at a position of magnetic field sensors of a magnetic field sensor arrangement 11. Magnetic field sensor arrangement 11 may comprise two or more magnetic field sensors, for example magnetoresistive sensors or Hall sensors. Magnetoresistive sensors generally use a magnetoresistive effect like giant magnetoresistance (GMR), anisotropic magnetoresistance (AMR) or tunneling magnetoresistance (TMR) to sense a magnetic field. Hall sensor elements use the Hall effect to sense a magnetic field.

Magnetic field sensor arrangement 11 transmits one or more signals m indicative of the magnetic field sensed to an evaluation circuit 12. Evaluation circuit 12, based on the one or more signals m, outputs one or more signals s indicative of a movement speed of magnetic field generating device 10 and hence of a rotational or linear movement speed of a device magnetic field generating device 10 is attached.

It should be noted that while in the above scenario magnetic field generating device 10 is attached to a moving device (e.g., axis) and magnetic field sensor arrangement 11 is stationary, in other embodiments also magnetic field sensor arrangement 11 may be attached to a moving device, while magnetic field generating device 10 is stationary. This also causes a relative movement between magnetic field generating device 10 and magnetic field sensor arrangement 11 when the moving device moves.

Signal s in embodiments is indicating or related to a period of a magnetic field of magnetic field generating device 10. For example, signal s may comprise pulses at each zero crossing of a magnetic field sensed by magnetic field sensor arrangement 11 or a signal derived from the sensed magnetic field. In such a case, as explained initially, for example for a pole wheel having 48 poles 90 pole pairs 96 pulses of such types are output per revolution of the device the pole wheel is mounted to.

Furthermore, in the embodiment of FIG. 1 evaluation circuit 12 is configured to perform an interpolation to output a second signal component of the one or more signals s which indicate intermediate positions between the positions associated with the periodicity of a magnetic field, for example between the 96 pulses mentioned above, at least for slow movement speeds (for example slow rotation speeds) below a threshold. Through such a second signal component, the resolution of the system may be increased. This in turn may be desired for some applications, like autonomous driving (e.g., parking) in automotive applications. Details of generation of such second signal component, e.g., by interpolation, will be described later.

As will be explained below, depending on the application, the one or more signals s may be output as a modification of some protocol used in the respective field, for example as a modification of the AK protocol in case of ABS sensors or similar automotive sensors using the AK protocol.

Figure 2:
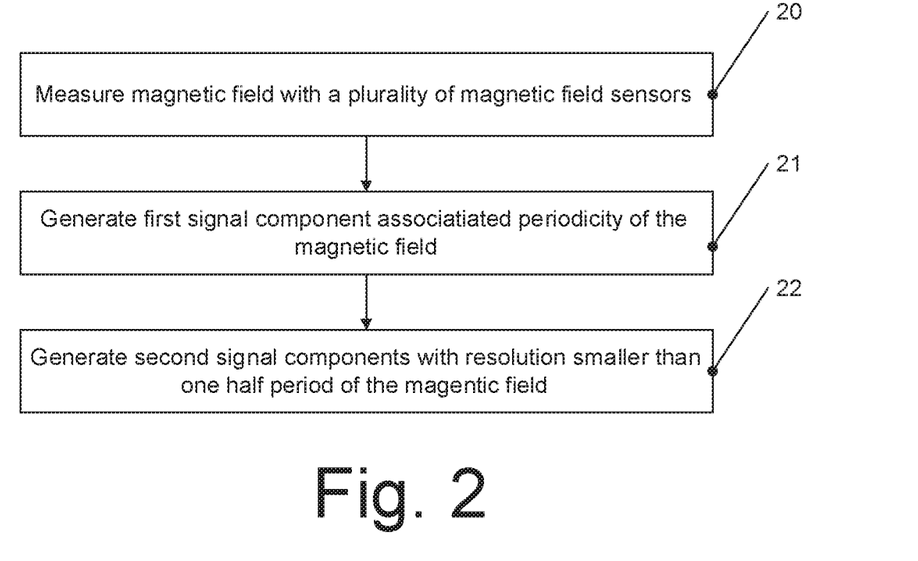
FIG. 2 is a flow chart illustrating a method according to an embodiment.

FIG. 2 is a flow chart illustrating a method according to an embodiment. The method of FIG. 2 may be implemented in the system of FIG. 1 or using any one of the devices discussed in the following, but may also be implemented independently therefrom. Furthermore, while the method of FIG. 2 is shown and illustrated as a series of acts or events, the order in which these acts or events are represented and described is not to be construed as limiting. In particular, the order may vary, and/or various acts or events may be performed in parallel, for example in different portions of a device or circuit.

At 20, the method comprises measuring a magnetic field generated by a magnetic field generating device like a magnet arrangement with a plurality of magnetic field sensors. As already explained with reference to FIG. 1, the magnetic field generating device may be mounted to a moveable element like a rotating element or a linearly moveable element, and/or may generate a periodic magnetic field. In other embodiments, the magnetic field sensors may be mounted to the moveable element, and the magnet arrangement may be stationary.

At 21, the method comprises generating a first signal component of one or more output signals associated with the periodicity of the magnetic field. For example, in case of an essentially sinusoidal or similar periodic magnetic field, the first signal component may be indicative of zero crossings of the magnetic field, such that the first signal component has a periodicity twice the periodicity of the magnetic field (two zero crossings in one period of a sinusoidal signal). At 22, the method furthermore comprises generating a second signal component of the one or more signals with a resolution smaller than one half period of the magnetic field by interpolation techniques, to increase the spatial resolution. It should be noted that the first and the second signal components may be signal components of a single signal in some embodiments, or may be transmitted as separate signals in other embodiments.

For example, as will be explained below in further detail, the first signal component may be a signal component transmitted by default by a protocol (for example the above-mentioned AK protocol), whereas the second signal component may be transmitted as a modification to the protocol.

Figure 3:
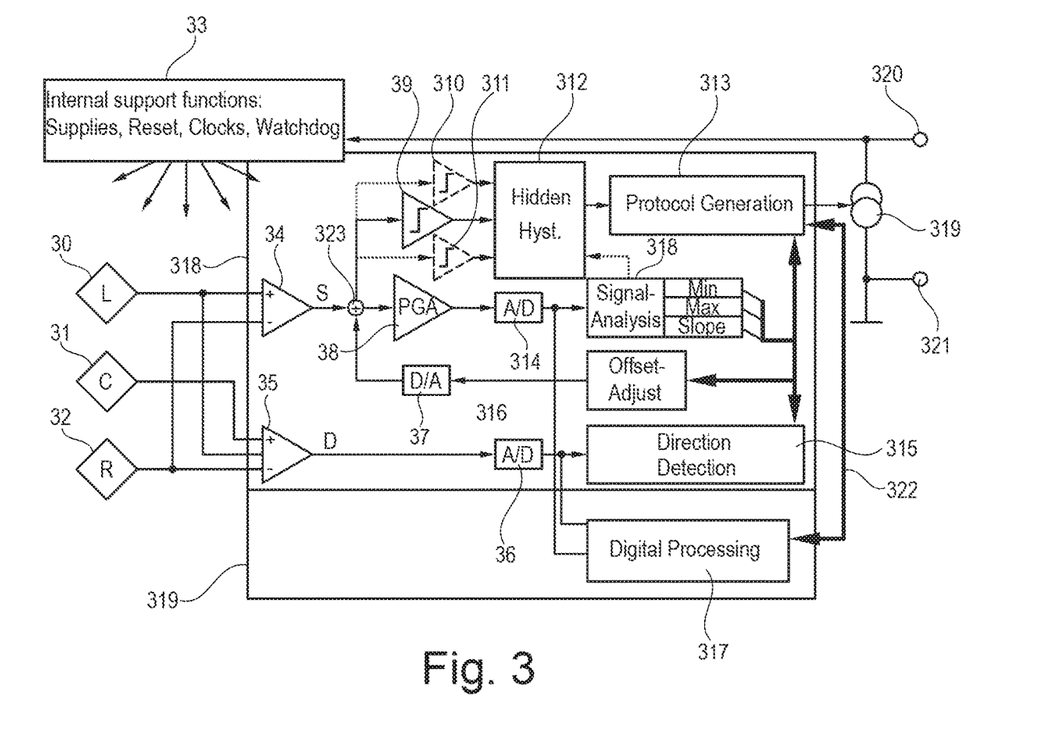
FIG. 3 is a detailed diagram illustrating a device according to an embodiment.

FIG. 3 is a detailed diagram illustrating a magnetic field sensor device according to an embodiment, which may be used in conjunction with a magnetic field generating device as discussed previously to form a system.

The device illustrated in FIG. 3 comprises three magnetic field sensors 30, 31 and 32, which may be arranged adjacent to each other such that sensor 31 is arranged between sensors

30, 32. Sensor 30 is also referred to "left" sensor, sensor 31 is referred to as "center" sensor, and sensor 32 is referred to as "right" sensor. These designations merely indicate the spatial relationship between the sensors and does not imply any absolute arrangement of the sensors. Sensors 30 to 32 may be implemented as any suitable kind of magnetic field sensors, for example based on magnetoresistive sensors or based on Hall sensors.

Signals from the sensors are provided to an evaluation circuit 318, 319. A block 318 of evaluation circuit 318, 319 essentially is configured to generate a first signal component as discussed above associated with a periodicity of a magnetic field generating device, which magnetic field is sensed by sensors 30 to 32, as well as to perform some additional functions as will be described below in detail. Block 319 is configured to perform an interpolation to generate a second signal component as discussed above, to increase a spatial resolution of movement detection in some embodiments. It should be noted that while FIG. 3 comprises numerous details, in other embodiments some of these details may be omitted.

An output signal of sensor 30 is provided to a positive input of a subtractor 34, and an output signal from sensor 32 is provided to a negative output of subtractor 34 to form an output signal S=L−R, L and R being the signals from sensors 30, 32, respectively.

Furthermore, the output signals L, R from sensors 30, 32 are provided to negative inputs of a subtractor 35, and an output C from sensor 31 is provided to a positive input of subtractor 35 to form a signal D=2C−L−R.

Signal D is provided to an analog-to-digital converter 36 to provide a digitized version of signal D. The digitized version of signal D is then provided to a direction detection circuit 315, which determines a direction of movement of the magnetic field generating device relative to the sensor device of FIG. 3 based on the digitized version of signal D. This may be done in any conventional manner.

Signal S is provided to an adder 323. Via feedback path comprising a programmable gain amplifier (PGA) 38, an analog-to-digital converter 314, a signal analysis circuit 318, an offset adjustment circuit 316 and a digital-to-analog converter 37, an output of which is coupled to adder 323, an offset compensation for signal S is performed. For example, signal S in case of a constant movement of the respective magnetic field generating device may be an essentially sinusoidal signal having an offset, and by the offset compensation this offset is removed, to generate a sinusoidal signal centered around zero. The thus offset corrected signal is provided to slicers 39 to 311 and a hidden hysteresis circuit 312 to perform further corrections and is then provided to a protocol generation circuit 313 which will be discussed later in more detail. The signal output by hidden hysteresis circuit 312 essentially provides a signal related to the periodicity of the magnetic field, for example provides zero crossings of signal S, which have a frequency twice the periodicity of the magnetic field. Therefore, this signal may essentially correspond to the first signal component discussed above.

Furthermore, an output of analog to digital converter 314 and an output of analog to digital converter 36 are provided to a digital processing circuit 317. In other words, a digitized version of signal D and a digitized and amplified (by PGA 38) and offset-compensated version of signal S are provided to digital processing circuit 317. In the embodiment of FIG. 3, based on these digital signals S' and D' digital processing circuit 317 performs calculation to generate a second signal component as discussed above, which provides intermediate values between indications of the first signal component. In some embodiments, this second signal component is provided only for small speeds, for example when intervals between pulses or other indications related to the periodicity fall below a threshold. Digital processing circuitry as indicated by an arrow 322 communicates with protocol generation 313, such that the second signal component may also be included in a protocol (for example a modified AK protocol), which is then output via terminals 320, 321 for example by driving a current source 319 according to the protocol.

Numeral 33 denotes internal support functions of the device like supply voltage generation, reset signals, clock signal generation and watchdog functions monitoring correct functioning of the device, which functions may be implemented in any conventional manner.

Various possibilities for an interpolation to generate intermediate values will be discussed in the following.

In case of a periodic field and constant movement of a corresponding magnetic field generating device, the signals L, C and R may approximately be written as:

$R=\sin(\omega \cdot t)$ $C=\sin(\omega \cdot t+p)$, and $L=\sin(\omega \cdot t+2 \cdot p)$ wherein ω is a measure of the periodicity, t is the time and p is a phase offset generated by the offset sensor positions. From this, signals S and D (apart from offset terms) are:

$S=L-R=-2\sin(p)\cdot\cos(\omega \cdot t+p)$, and $D=2C-L-R=2(\cos(p)-1)\cdot\sin(\omega \cdot t+p)$ The zero crossings of signal S may correspond to the first signal component and occur twice in each period. Intermediate phase interpolation (e.g., by digital processing circuit 317) may be performed according to $\text{phase}=\text{atan}(-S/D)\cdot\text{corr}$, wherein phase gives the phase information, atan is the arc tangent function and corr is an amplitude correction term which depends on the amplitude ratio between signals S/D and which is determined such that the amplitude ratio time corr is equal to 1.

In this way, without additional measurements based on the signals provided by the three sensors 30-32 a phase information may be obtained. The phase information may then be output as second signal component in an output signal of the magnetic field sensor device.

The amplitude correction corr may be determined on the physical dimensions of the systems, for example based on a distance between sensors 30-32 and the magnetic field generating device, and/or may be determined based on calibration measurement at a start of operation after a first period was measured based on the measured amplitudes for signals S and D.

It should be noted that while in FIG. 3 various blocks are shown, for example 312, 313, 315, 317, 316, 318 these need not be implemented as separate entities, but may also be implemented in a common circuit, for example using a single signal processor or digital processing device.

Figure 4:
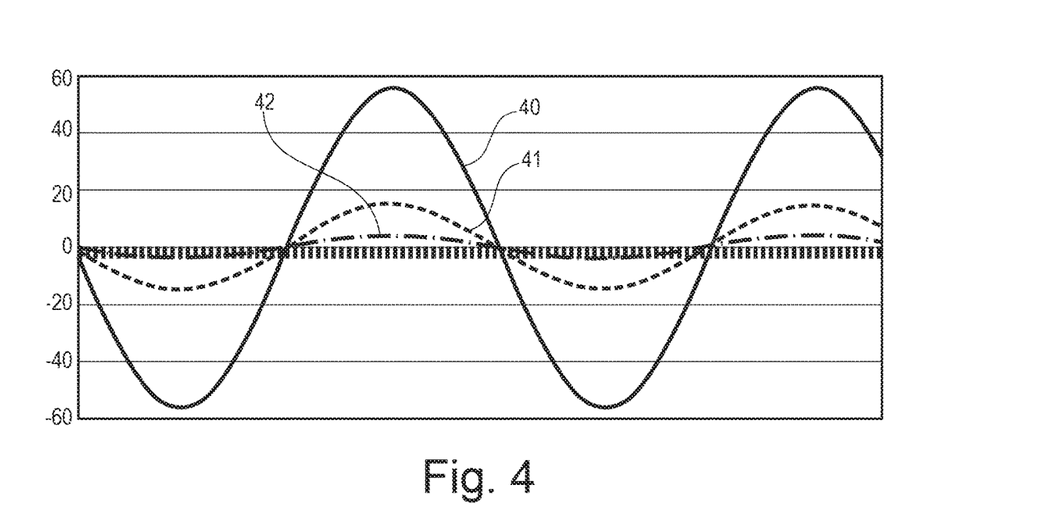
FIGS. 4-6 are curves illustrating systems and devices according to embodiments.
Figure 5:
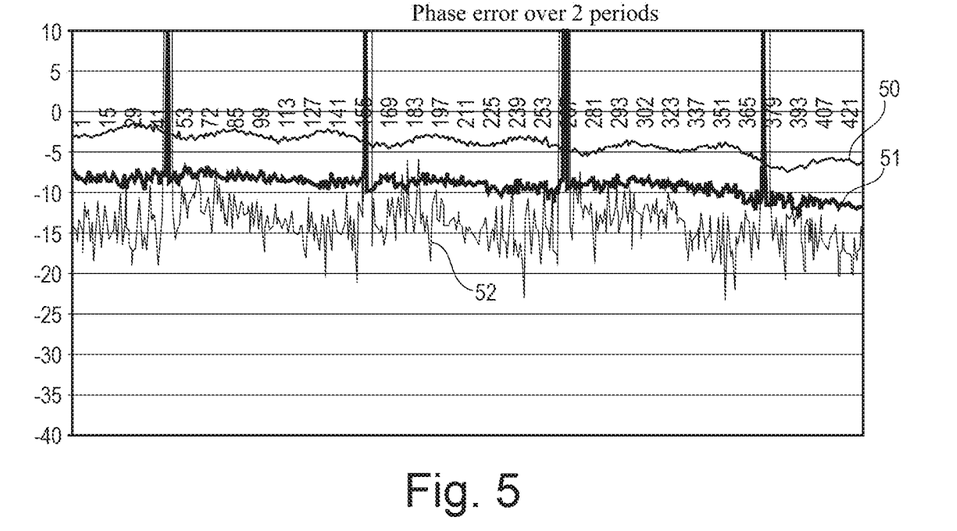
Figure 6:
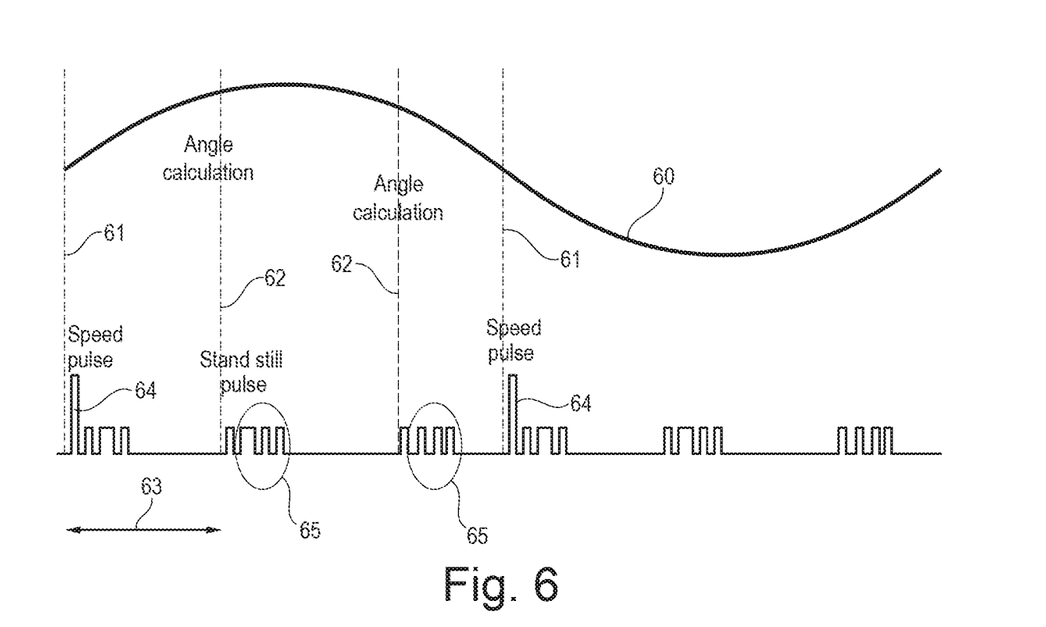

This phase determination by interpolation and transmission of a corresponding signal will now be further illustrated referring to FIGS. 4-6.

FIG. 4 illustrates a magnetic signal of a pole wheel for different airgaps, e.g., different distances from the pole wheel to a magnetic field sensor arrangement like sensors 30-32 of FIG. 3. Approximately, two periods of the magnetic field are shown. A curve 40 illustrates the magnetic field for an example airgap of 1 mm, a curve 41 illustrates the magnetic field for an example airgap of 2 mm, and a curve 42 illustrates the magnetic field for an airgap of 1 mm, each as measured differentially by a sensor pair (for example as signal S in FIG. 3) in arbitrary units. As can be seen, the signal drops significantly with increasing airgap, which also increases the signal to noise ratio (SNR).

FIG. 5 illustrates a phase error when a phase is interpolated as discussed above based on signals S and D, for the three airgaps shown in FIG. 5. A curve 50 illustrates the phase error for an airgap of 1 mm, a curve 51 illustrates the phase error for an airgap of 2 mm, and a curve 52 illustrates the phase error for an airgap of 3 mm. The peaks illustrate the zero crossings of FIG. 4, where the phase is "reset" to 0 at the zero crossing.

The resulting incremental phase error within one period is smaller than 5° at all airgaps (with an offset subtracted at the beginning of each period), whereas for example from a simple linear estimation from the signal S errors of greater than 30° can occur. Therefore, even for large airgaps the resolution can be significantly improved by this interpolation in some embodiments.

FIG. 6 illustrates an example output signal based on a modified AK protocol usable in some embodiments, for example as an output signal generated at terminals 320, 319 of FIG. 3 by protocol generation circuit 313. A curve 60 in FIG. 6 illustrates the magnetic field, with an essentially sinusoidal variation. Dashed lines 61 mark the zero crossings. At each zero crossing, a speed pulse 64 having for example an increased amplitude as shown is output.

In case of a slow movement, a standstill time out time indicated by an arrow 63 expires before a next zero crossing is reached. In this case, at time positions marked by dashed lines 62, phase estimation using the angle calculation with an arc tangent function as discussed above or a cordic approximation is used. The result is output in standstill pulses 65 as indicated. In the example shown, the phase information is Manchestercoded in the pulses, which for the Manchester coding have different pulse lengths. Manchester coding is only one example for possible coding, and any other modulation or coding, for example pulse width modulation, may also be used. It should be noted that depending on an accuracy and frequency requirement for the measurement the standstill time indicated by arrow 63 and/or the number of pulses in the Manchester coding may vary depending on the implementation.

With the above examples using signals S and D, two signals having a phase shift of 90° to each other are used for the phase approximation (cosine term in S and sine term in D in the example given above). In other embodiments, two signals having a different phase shift than 90° from each other may be used, as long as the phase difference is constant, in some embodiments. It should be noted that a constant phase difference is generally present if two or more sensors are provided in a fixed spatial relationship with a corresponding periodic magnetic field generating device like a pole wheel with regularly spaced pole pairs or a tooth wheel with regularly spaced teeth. Therefore, while three magnetic field sensors are used in the examples above, in other embodiments, only two magnetic field sensors in two different locations may be used, the distance between the locations defining the phase difference. Then, for example a speed signal S and a direction signal D may be calculated by S=A−B and D=A+B or S=A and D=B, wherein A and B are the signals from the two sensors. The deviation from 90° phase difference, also referred to as orthogonality error, may then be compensated in the calculation using conventional angle error compensation techniques. The angle may then also be calculated or estimated with a cordic algorithm or similar algorithm.

Next, a further approach for interpolation to generate the second signal component will be discussed referring to FIGS. 7-13. In this approach, by an approximation between adjacent sensors, "virtual" sensor signals are generated, which may be used to detect for example zero crossings having a phase shift to the zero crossings of the signal S discussed above, and therefore may increase the resolution of the device. This approach generally uses weighted sums of signals from neighboring magnetic field sensors and uses that all sensors essentially see the same signal after a movement of the magnetic field generating device by the distance between the two sensor elements. Therefore, the weighted sum of two sensors has the same periodicity as the signals of the real sensors, and further the signal (in particular the phase of the signal) is closer to the signal of the real sensor that contributes to the sum with a higher weight.

Figure 7:
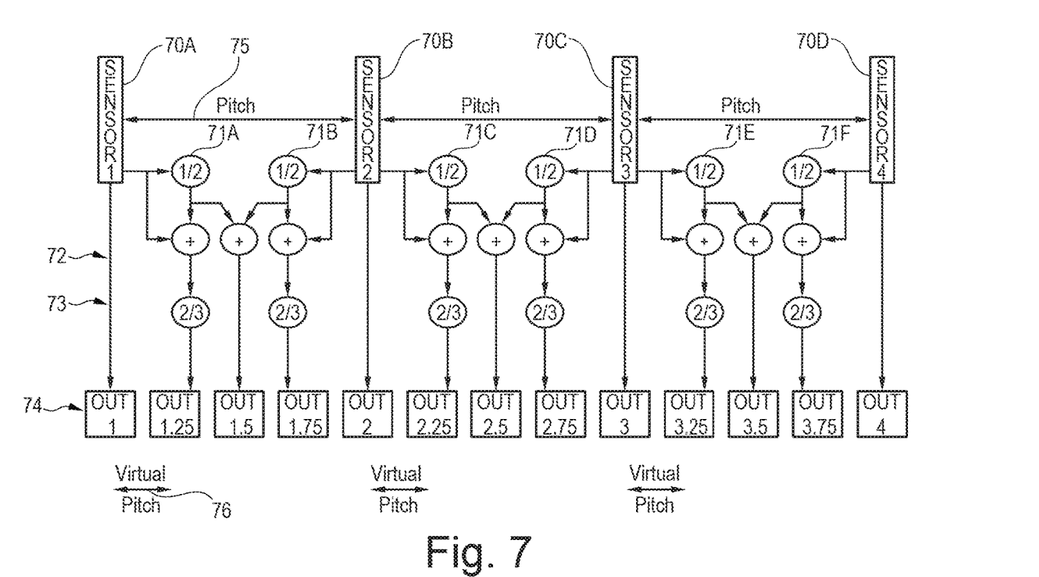
FIG. 7 is a diagram illustrating operation of a device according to an embodiment.

FIG. 7 shows an illustrative example for such an implementation with four magnetic field sensors 70A-70D spaced apart by pitches 75, which in the example of FIG. 7 are equidistant. In other embodiments, the distance between neighboring sensors may vary. In other embodiments, another number of sensors may be provided, for example two sensors, three sensors or more than four sensors. Signals from sensors 70A, 70B, 70C and 70D (collectively referred to as sensors 70) are provided to multipliers 71A-71F (collectively referred to as multipliers 71) and to adders 72. In the example of FIG. 7, between each pair of sensors (for example 70A, 70B) three adders 72 are provided. For the following explanation, the sensor pair 70A, 70B will be used. The same explanations apply to other sensor pair 70B, 70C and 70C, 70D.

Between sensors 70A, 70B, a left adder 72 receives a signal directly from sensor 70A and from sensor 70B via multiplier 71B, such that the output of this left adder is the signal from sensor 70A plus ½ the signal from sensor 70B (weight 2:1). A middle adder 72 receives ½ time the sensor signal from sensor 70A (multiplied by multiplier 71A) and ½ the signal from sensor 70B (multiplied by multiplier 71B), such that the output of this middle adder is ½ the signal from sensor 70A plus ½ the signal from sensor 70B. The right adder receives the signal from sensor 70B plus ½ the signal from sensor 70A (via multiplier 71A), such that its output is the signal from sensor 70B plus ½ the signal from sensor 70A (ratio 1:2). Via multipliers 73, the signals from the left and right adders are then normalized by multiplying them with ⅔.

It should be noted that the designations "between", "left", "middle" and "right" when referring to the adders and multipliers of FIG. 7 do not imply any spatial arrangement in an actual implementation, but merely is for ease of reference of referring to elements of the figures.

The signals thus generated may be seen as signals from a plurality of sensors 74 distanced by a virtual pitch 76, which is smaller than pitch 75. Zero crossings of each of these sensors may be evaluated to provide an increased spatial resolution compared to evaluating only directly the signals from sensors 70. Therefore, by using weighted sums of sensor signals as illustrated in FIG. 7, a resolution may be increased.

Figure 8:
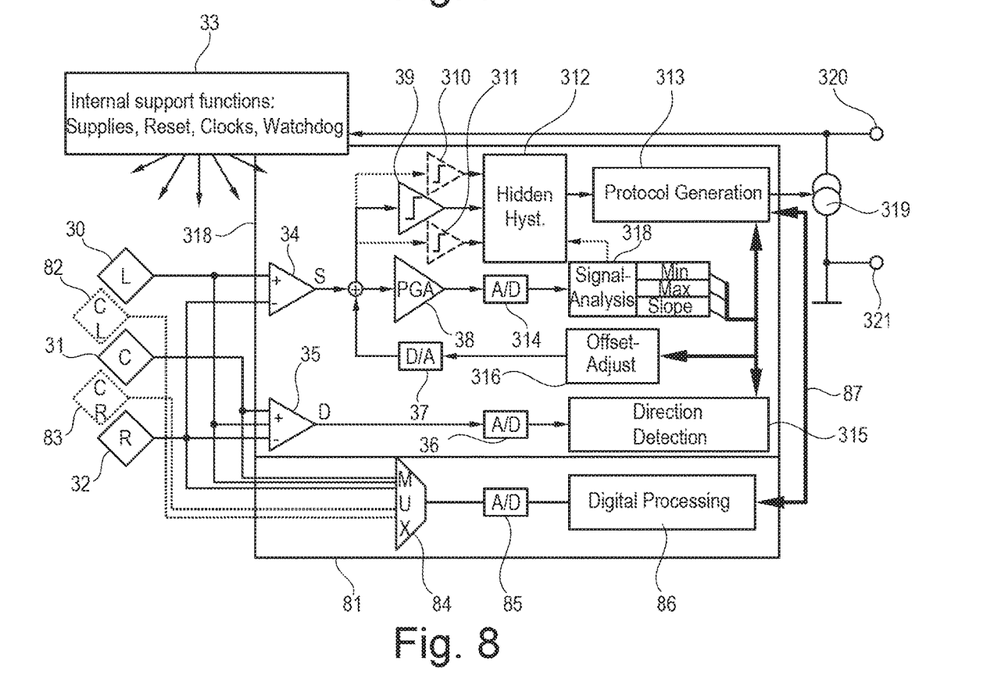
FIG. 8 is a detailed diagram illustrating a device according to an embodiment.

FIG. 8 is a detailed diagram of a sensor device using such an interpolation.

The embodiment of FIG. 8 is a variation of the embodiment of FIG. 3, and the same or similar elements bear the same reference numerals and will not be described again in detail. In particular, the generation of a first signal component based on signals S and D, in particular corresponding to zero crossings of signal S, may be the same as already described referring to FIG. 3.

In the embodiment of FIG. 8, additionally signals from sensors 30-32 are provided to a block 81 which generates the second signal component at least in case of a slow motion speed, for example when a time distance between zero crossings of signals S exceeds a predetermined threshold, as explained above.

Based on these signals, which are analog to digital converted in an analog to digital converter 85, a digital processing circuit 86 interpolates signals from intermediate virtual sensors between sensors 30-32, as symbolized by virtual sensors 82, 83 in FIG. 8. For interpolations, approaches as illustrated above with respect to FIG. 7 may be used.

As symbolized by a multiplexer 84, digital processing circuit 86 may then determine zero crossings for each of the signals from sensors 30-32 and the virtual sensors 82, 83 to provide a higher spatial resolution of a movement measurement.

It should be noted that virtual sensors 82, 83 and their connection to multiplexer 84 merely symbolize operation of the embodiment of FIG. 8 and are not to be regarded as real connection. Multiplexer 84 in FIG. 8 multiplexes the signals from sensors 30-31 to analog to digital converter 85 such that only one analog to digital converter is necessary. In other embodiments, multiplexer 84 may be omitted, and separate analog to digital converters may be provided for sensors 30-32.

Figure 9:
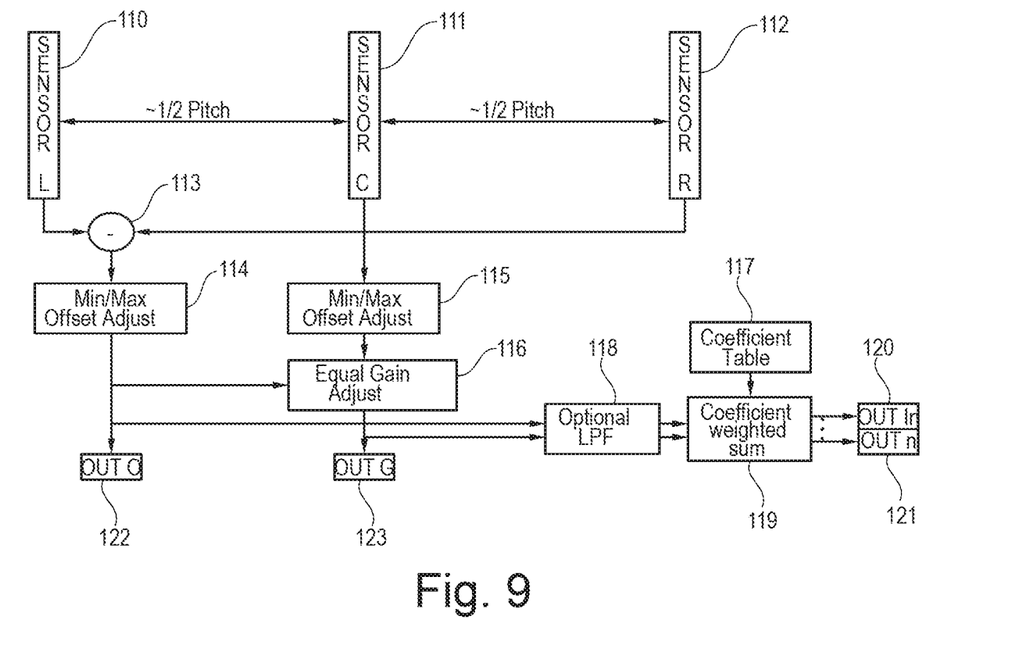
FIG. 9 is a block diagram illustrating a device according to an embodiment.

FIG. 9 illustrates a device according to a further embodiment, which uses an interpolation between sensors. In the embodiment of FIG. 9, an arrangement with three sensors 110, 111 and 112, as also illustrated in FIGS. 3 and 8, is used. Such three sensors are used in some existing sensor devices anyway, such that implementation of such embodiments do not require significant additional hardware, but essentially only require additional evaluation of the measured signals.

In the example shown in FIG. 9, sensors 110-112 may be arranged as shown in FIGS. 3 and 8, with sensor 110 as a "left" sensor, sensor 112 as a "right" sensor and sensor 111 as a "center" sensor.

A subtractor 113 forms a difference signal between signals provided by sensors 110 and 112.

An output signal of subtractor 113 is provided to an offset adjustment circuit 114, which may determine minimum and maximum values of the difference signal output by subtractor 113 and provide an offset adjustment such that the difference signal is centered around 0, for example.

Furthermore, the signal from sensor 111 is provided to an offset compensation circuit 115 which may operate in a similar manner to offset compensation circuit 114, i.e., it determines minimum and maximum values of the sensor signal and provides an offset compensation to center these minimum and maximum values around 0.

The thus offset compensated signal from circuit 114 may be output as signal D at an output terminal 122. This is another example for the formation of a signal D usable for direction detection, further to the formation discussed referring to subtractor 35 of FIGS. 3 and 8.

Furthermore, in a gain adjust circuit 116, for example comprising a programmable gain amplifier, the amplitudes of the signal output by circuits 114, 115 are adapted to each other such that an output signal of circuit 116 has essentially the same amplitude as the output signal of circuit 114. The output of circuit 116 is then output as center signal at a terminal 123.

The output signals of circuits 114, 116 are used for interpolation in blocks 117-120 as will be explained in the following. First, the signals are provided to an optional low pass filter 118, for example to remove undesired high frequency components. In a circuit 119, weighted sums of the two signals are formed, similar to what has been explained for adders 72 of FIG. 7, to generate intermediate signals. Coefficients for the weighted sums may be stored in a coefficient table 117. Corresponding interpolated output signals are output at terminals 120, 121, of which two are shown and which may be provided corresponding to a number of interpolated signals formed. The number of interpolated signals is not particularly limited and may be selected for example depending on a required resolution.

In this case, as a difference signal (output by subtractor 113) and a center signal (from sensor 111) are used for implementation, depending on the coefficients used in uneven distribution of intermediate signals over a signal period may result. However, this may still give acceptable results in embodiments.

Figure 10:
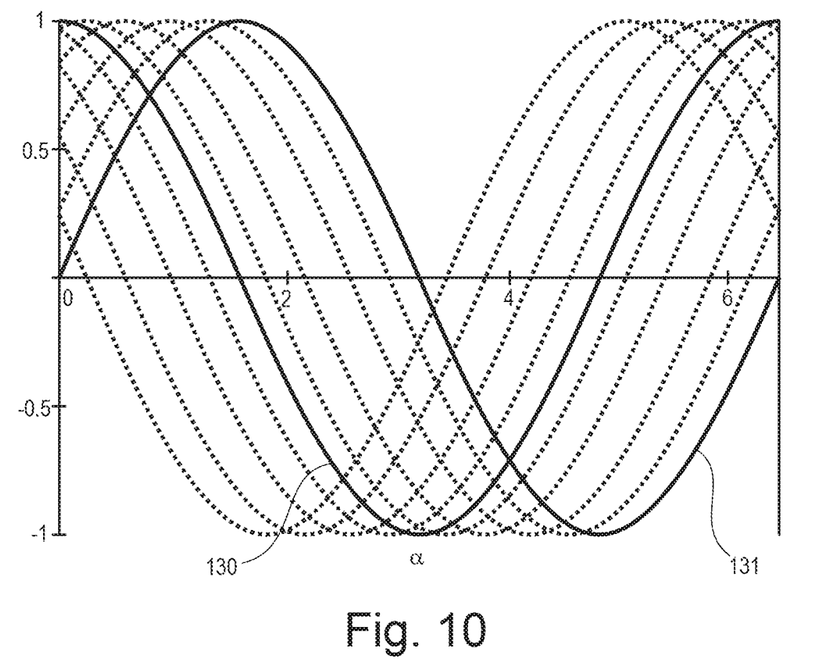
FIGS. 10 and 11 are diagrams showing curves for illustrating embodiments.

The interpolation results may also depend on the strength of the magnetic field. To illustrate this, FIG. 10 illustrates simulation results for low field signals. Here, a curve 130 serves as an example for a signal C at terminal 123 and follows a cosine function, and a curve 131 is used as an example for the difference signal D at terminal 122 following a sine function in this example. C is the signal at terminal 123 (essentially the normalized signal from sensor 111), and D is the signal at terminal 122 (essentially the normalized output signal from subtractor 113). In dotted lines, interpolated curves are shown. These curves were interpolated according to (0.2 C+0.8 D)·1.21, (0.4 C+0.6 D)·1.38, (0.6 C+0.4 D)·1.38, (0.8 C+0.2 D)·1.21, (0.8 C−0.2 D)·1.21, (0.6 C−0.4 D)·1.38, (0.4 C−0.6 D)·1.38 and (0.2 C−0.8 D)·1.21, respectively. The factors 1.21, 1.38 are selected such all the signals have essentially similar amplitudes.

Figure 11:
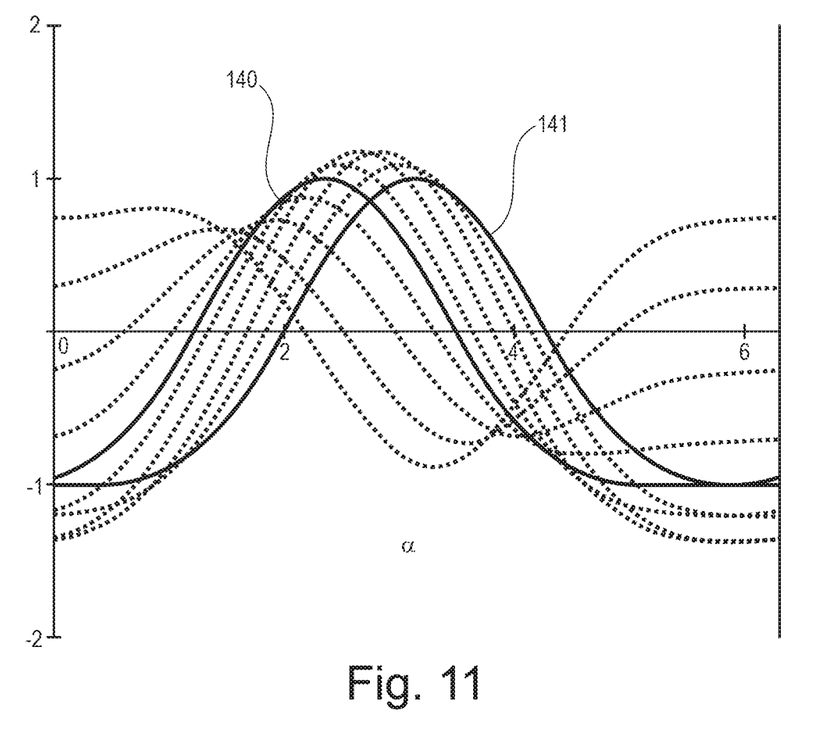

FIG. 11 then illustrates an example for high magnetic field signals, where a curve 140 represents an example for signal $C(\alpha)$ according to $2 \cdot (\sin(0.5\alpha+\pi/8)^4-0.5)$ and curve 141 is an example for signal $D(\alpha)=2 \cdot (\sin(0.5\alpha)^4-0.5)$ as examples for signals C and D. $\alpha$ is the angle, and the power of 4 represents the high field magnetoresistive sensors may be nonlinear in high fields and therefore the effective output signal of sinusoidal magnetic fields is non sinusoidal and the weighted sum does not produce a linear phase shift, which effect is represented by the power of 4 in the above equations. Therefore, even with high magnetic fields with such interpolation the accuracy of movement detection like speed detection or position detection can be improved in contrast to using only the sensor signals S or only signals S and D or C and D as discussed above. To generate more uniform interpolated curves than shown in FIG. 11, in other embodiments, sensors are placed over more than a length of half of a pole pitch of a pole wheel in order to obtain signals distributed equally over a whole period even if the signal shape is not rotation symmetric to 180°, as in the example of FIG. 11.

The following examples are example embodiments.

Example 1

A sensor device, including: a magnetic field sensor arrangement comprising a plurality of magnetic field sensors, and an evaluation circuit coupled to the magnetic field sensor arrangement and configured to generate a first signal component associated with a periodicity of a magnetic field sensed by the magnetic field sensor arrangement and to generate a second signal component having a resolution smaller than one half period of the magnetic field at least when a period length of the sensed magnetic field exceeds a predetermined threshold.

Example 2

The sensor device of example 1, wherein generating the first signal component comprises generating indications of zero crossings of a first signal based on the detected magnetic field.

Example 3

The sensor device of example 2, wherein the first signal is a difference signal indicative of a difference between a first sensor signal generated by a first sensor of the plurality of magnetic field sensors and a second signal generated by a second sensor of the plurality of magnetic field sensors.

Example 4

The sensor device of example 1, wherein generating the second signal component comprises performing a phase estimation.

Example 5

The sensor device of example 4, wherein the phase estimation comprises calculating an estimated phase based on a first signal derived from sensor signals of the plurality of sensors and a second signal based on sensor signals from the plurality of signals.

Example 6

The sensor device of example 5, wherein the first signal is a difference signal between a first sensor signal from a first sensor of the plurality of sensors and a second sensor signal from a second sensor of the plurality of sensors, and wherein the second signal is a difference between twice a third sensor signal from a third sensor of the plurality of sensors and a sum of the first and second sensor signals.

Example 7

The sensor device of example 5, wherein the evaluation circuit is configured to calculate the first and second signals to have a phase difference of 90°.

Example 8

The sensor device of example 5, wherein estimating the phase comprises calculating an arc tangent or a cordic approximation of an arc tangent based on a ratio between the second signal and the first signal.

Example 9

The sensor device of example 1, wherein generating the second signal component comprises calculating virtual sensor signals associated with virtual sensors arranged between the plurality of magnetic field sensors.

Example 10

The sensor device of example 9, wherein calculating virtual sensor signals comprises calculating weighted sums of sensor signals from the plurality of magnetic field sensors.

Example 11

The sensor device of example 9, wherein the second signal component is indicative of zero crossings of the virtual sensor signals.

Example 12

The sensor device of example 1, further comprising generating an output signal based on the first signal component and the second signal component according to a modified AK protocol.

Example 13

A system including a magnetic field generating device generating a periodic magnetic field, and a sensor device according to example 1, wherein the magnetic field generating device is movable relative to the magnetic field sensor arrangement of the sensor device.

Example 14

The system of example 13, wherein the magnetic field generating device comprises at least one of a pole wheel or a tooth wheel.

Example 15

A method includes measuring a magnetic field with a magnetic field sensor arrangement comprising a plurality of magnetic field sensors, generating a first signal component associated with a periodicity of the magnetic field, and generating a second signal component with as resolution smaller than one half period of the magnetic field.

Example 16

The method of example 15, wherein generating the first signal component comprises generating indications of zero crossings of a first signal based on the detected magnetic field.

Example 17

The method of example 16, wherein the first signal is a difference signal indicative of a difference between a first sensor signal generated by a first sensor of the plurality of magnetic field sensors and a second signal generated by a second sensor of the plurality of magnetic field sensors.

Example 18

The method of example 15, wherein generating the second signal component comprises performing a phase estimation.

Example 19

The method of example 18, wherein the phase estimation comprises calculating an estimated phase based on a first signal derived from sensor signals of the plurality of sensors and a second signal based on sensor signals from the plurality of signals, wherein the first signal is a difference signal between a first sensor signal from a first sensor of the plurality of sensors and a second sensor signal from a second sensor of the plurality of sensors, and wherein the second signal is a difference between twice a third sensor signal from a third sensor of the plurality of sensors and a sum of the first and second sensor signals.

Example 20

The method of example 15, wherein generating the second signal component comprises calculating virtual sensor signals associated with virtual sensors arranged between the plurality of magnetic field sensors.

As can be seen, with the techniques as discussed above a resolution may be improved. In some implementations, this may be done using existing sensors, for example sensors used in conventional solutions to determine movement speed or movement direction. In view of the many variations and modifications discussed above, it is evident that the above-discussed embodiments are not to be construed as limiting.

What is claimed is:

1. A sensor device, comprising:
a magnetic field sensor arrangement comprising a plurality of magnetic field sensors; and
an evaluation circuit coupled to the magnetic field sensor arrangement, the evaluation circuit configured to generate a first signal component associated with a periodicity of a magnetic field sensed by the magnetic field sensor arrangement and to generate a second signal component having a resolution smaller than the first signal component,
wherein the evaluation circuit is configured to:
determine a phase between a first signal and a second signal, wherein the first signal is derived from a first set of the plurality of magnetic field sensors and the second signal is derived from a second set of the plurality of magnetic field sensors,
determine an incremental phase error based on the determined phase and a constant phase difference, and
generate the second signal component as the incremental phase error.

2. The sensor device of claim 1, wherein the resolution of the second signal component is smaller than one half period of the magnetic field at least when a period length of the sensed magnetic field exceeds a predetermined threshold.

3. The sensor device of claim 1, wherein the evaluation circuit is configured to generate indications of zero crossings of the first signal based on the sensed magnetic field, and generate the first signal component based on the generated indications of zero crossings.

4. The sensor device of claim 3, wherein the first signal is a difference signal indicative of a difference between a first sensor signal generated by a first sensor of the plurality of magnetic field sensors and a second sensor signal generated by a second sensor of the plurality of magnetic field sensors.

5. The sensor device of claim 1, wherein:
the first signal is a difference signal between a first sensor signal from a first sensor of the plurality of magnetic field sensors and a second sensor signal from a second sensor of the plurality of magnetic field sensors, and
the second signal is a difference between twice a third sensor signal from a third sensor of the plurality of magnetic field sensors and a sum of the first sensor signal and the second sensor signal.

6. The sensor device of claim 5, wherein the evaluation circuit is configured to calculate the first signal and the second signal to have a phase difference of 90°.

7. The sensor device of claim 1, wherein the evaluation circuit is configured to generate an output signal based on the first signal component and the second signal component according to a modified AK protocol.

8. The sensor device of claim 1, further comprising:
a magnetic field generating device generating a periodic magnetic field, wherein the magnetic field generating device is movable relative to the magnetic field sensor arrangement.

9. The sensor device of claim 8, wherein the magnetic field generating device comprises at least one of a pole wheel or a tooth wheel.

10. A sensor device, comprising:
a magnetic field sensor arrangement comprising a plurality of magnetic field sensors; and
an evaluation circuit coupled to the magnetic field sensor arrangement, the evaluation circuit configured to generate a first signal component associated with a periodicity of a magnetic field sensed by the magnetic field sensor arrangement and to generate a second signal component having a resolution smaller than the first signal component,
wherein the evaluation circuit is configured to perform a phase estimation and generate the second signal component based on an estimated phase determined from the phase estimation,
wherein the phase estimation comprises calculating the estimated phase based on a first signal and a second signal, wherein the first signal is derived from a first set of sensor signals from the plurality of magnetic field sensors, and the second signal is derived from a second set of sensor signals from the plurality of magnetic field sensors, and
wherein:
the first signal is a difference signal between a first sensor signal from a first sensor of the plurality of magnetic field sensors and a second sensor signal from a second sensor of the plurality of magnetic field sensors, and
the second signal is a difference between twice a third sensor signal from a third sensor of the plurality of magnetic field sensors and a sum of the first sensor signal and the second sensor signal.

11. The sensor device of claim 10, wherein the phase estimation comprises calculating an arc tangent or a cordic approximation of an arc tangent based on a ratio between the second signal and the first signal.

12. A sensor device, comprising:
a magnetic field sensor arrangement comprising a plurality of magnetic field sensors; and
an evaluation circuit coupled to the magnetic field sensor arrangement, the evaluation circuit configured to generate a first signal component associated with a periodicity of a magnetic field sensed by the magnetic field sensor arrangement and to generate a second signal component having a resolution smaller than the first signal component,
wherein the evaluation circuit is configured to calculate virtual sensor signals associated with virtual sensors arranged between the plurality of magnetic field sensors, and generate the second signal component based on the virtual sensor signals, wherein the evaluation circuit is configured to calculate the virtual sensor signals by calculating weighted sums of sensor signals from the plurality of magnetic field sensors, wherein the plurality of magnetic field sensors include a first sensor configured to generate a first signal and a second sensor configured to generate a second signal, and wherein the evaluation circuit is configured to generate a first virtual sensor signal based on a sum of the first signal and one half of the second signal, generate a second virtual sensor signal based on a sum of one half of the first signal and one half of the second signal, and generate a third virtual sensor signal based on a sum of the second signal and one half of the first signal.

13. The sensor device of claim 12, wherein the second signal component is indicative of zero crossings of the virtual sensor signals.

14. The sensor device of claim 12, wherein the resolution of the second signal component is smaller than one half period of the magnetic field at least when a period length of the sensed magnetic field exceeds a predetermined threshold.

15. A method, comprising:
measuring a magnetic field with a magnetic field sensor arrangement comprising a plurality of magnetic field sensors;
generating a first signal component associated with a periodicity of the magnetic field; and
generating a second signal component with a resolution smaller than the first signal component,
wherein the generating the second signal component comprises:
determining a phase between a first signal and a second signal, wherein the first signal is derived from a first set of the plurality of magnetic field sensors and the second signal is derived from a second set of the plurality of magnetic field sensors;
determining an incremental phase error based on the determined phase and a constant phase difference; and
generating the second signal component as the incremental phase error.

16. The method of claim 15, wherein generating the first signal component comprises generating indications of zero crossings of the first signal based on the detected magnetic field.

17. The method of claim 16, wherein the first signal is a difference signal indicative of a difference between a first sensor signal generated by a first sensor of the plurality of magnetic field sensors and a second sensor signal generated by a second sensor of the plurality of magnetic field sensors.

18. The method of claim 15, wherein:
the first signal is a difference signal between a first sensor signal from a first sensor of the plurality of magnetic field sensors and a second sensor signal from a second sensor of the plurality of magnetic field sensors, and
the second signal is a difference between twice a third sensor signal from a third sensor of the plurality of magnetic field sensors and a sum of the first sensor signal and the second sensor signal.

19. A method, comprising:
measuring a magnetic field with a magnetic field sensor arrangement comprising a plurality of magnetic field sensors;
generating a first signal component associated with a periodicity of the magnetic field; and
generating a second signal component with a resolution smaller than the first signal component,
wherein generating the second signal component comprises performing a phase estimation,
wherein performing the phase estimation comprises calculating an estimated phase based on a first signal derived from a first set of sensor signals from the plurality of magnetic field sensors and a second signal derived from a second set of sensor signals from the plurality of magnetic field sensors,
wherein the first signal is a difference signal between a first sensor signal from a first sensor of the plurality of magnetic field sensors and a second sensor signal from a second sensor of the plurality of magnetic field sensors, and
wherein the second signal is a difference between twice a third sensor signal from a third sensor of the plurality of magnetic field sensors and a sum of the first sensor signal and the second sensor signal.

20. A method, comprising:
measuring a magnetic field with a magnetic field sensor arrangement comprising a plurality of magnetic field sensors;
generating a first signal component associated with a periodicity of the magnetic field; and
generating a second signal component with a resolution smaller than the first signal component,
wherein generating the second signal component comprises calculating virtual sensor signals associated with virtual sensors arranged between the plurality of magnetic field sensors,
wherein the plurality of magnetic field sensors include a first sensor configured to generate a first signal and a second sensor configured to generate a second signal,
wherein calculating virtual sensor signals comprises:
calculating the virtual sensor signals by calculating weighted sums of sensor signals from the plurality of magnetic field sensors,
generating a first virtual sensor signal based on a sum of the first signal and one half of the second signal;
generating a second virtual sensor signal based on a sum of one half of the first signal and one half of the second signal; and
generating a third virtual sensor signal based on a sum of the second signal and one half of the first signal.

* * * * *